United States Patent
Jung et al.

(10) Patent No.: US 11,820,256 B2
(45) Date of Patent: Nov. 21, 2023

(54) SEAT FOR A VEHICLE

(71) Applicants: Hyundai Motor Company, Seoul (KR); Kia Corporation, Seoul (KR)

(72) Inventors: Chan Ho Jung, Gyeonggi-do (KR); Deok Soo Lim, Gyeonggi-Do (KR); Bong Ku Kim, Seoul (KR); Hyun Kyu Moon, Gyeonggi-do (KR); Mu Young Kim, Gyeonggi-do (KR); Seon Chae Na, Gyeonggi-do (KR); Sang Do Park, Gyeonggi-Do (KR); Sang Soo Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 58 days.

(21) Appl. No.: 17/564,423

(22) Filed: Dec. 29, 2021

(65) Prior Publication Data

US 2023/0041032 A1 Feb. 9, 2023

(30) Foreign Application Priority Data

Aug. 3, 2021 (KR) .......................... 10-2021-0101859

(51) Int. Cl.
| | |
|---|---|
| *B60N 2/12* | (2006.01) |
| *B60N 2/02* | (2006.01) |
| *B60N 2/50* | (2006.01) |
| *B60N 2/853* | (2018.01) |
| *B60N 2/68* | (2006.01) |
| *B60N 2/54* | (2006.01) |

(52) U.S. Cl.
CPC ............. *B60N 2/12* (2013.01); *B60N 2/0232* (2013.01); *B60N 2/504* (2013.01); *B60N 2/507* (2013.01); *B60N 2/544* (2013.01); *B60N 2/68* (2013.01); *B60N 2/853* (2018.02)

(58) Field of Classification Search
CPC . B60N 2/12; B60N 2/853; B60N 2/10; B60N 2/54; B60N 2/0232; B60N 2/504; B60N 2/507; B60N 2/544; B60N 2/68; B60N 2/1695; B60N 2/995; B60N 2/1817; B60N 2/185; B60N 2/20; B60N 2/2209; B60N 2/505; B60N 2/506; B60N 2/508
USPC ...................................... 297/445.1
See application file for complete search history.

(56) References Cited

U.S. PATENT DOCUMENTS

| | | | | |
|---|---|---|---|---|
| 2010/0066146 | A1* | 3/2010 | Weber ................... | B60N 2/162 297/340 |
| 2011/0025106 | A1* | 2/2011 | Okamoto ............. | B60N 2/7094 297/216.1 |
| 2013/0200675 | A1* | 8/2013 | Beneker ............... | B60N 2/1615 297/344.1 |
| 2015/0239373 | A1* | 8/2015 | Weng ................. | B60N 2/42754 297/216.1 |

(Continued)

FOREIGN PATENT DOCUMENTS

KR 10-2009-0126045 * 12/2009

*Primary Examiner* — Mark R Wendell
(74) *Attorney, Agent, or Firm* — Fox Rothschild LLP (57) ABSTRACT

A seat for a vehicle including support links enabling a rotating motion and a sliding motion between a seat frame and seat rails, the support links being mounted so that the seat may be rotated in the forward and rearward directions as in a seesaw motion about a shaft of a vehicle in a width direction of the vehicle, so as to easily implement a facing mode posture, in which passengers sit facing each other, a relaxed comfort posture, etc.

13 Claims, 7 Drawing Sheets

(56) References Cited

U.S. PATENT DOCUMENTS

| | | | |
|---|---|---|---|
| 2015/0375647 A1* | 12/2015 | Behrens | B60N 2/1695 |
| | | | 297/325 |
| 2016/0107549 A1* | 4/2016 | Janicek | B60N 2/43 |
| | | | 297/216.1 |
| 2018/0065509 A1* | 3/2018 | Ohashi | B60N 2/1615 |

* cited by examiner

SEAT FOR A VEHICLE

CROSS-REFERENCE TO RELATED APPLICATION

This application claims under 35 U.S.C. § 119(a) the benefit of Korean Patent Application No. 10-2021-0101859 filed on Aug. 3, 2021, the entire contents of which are incorporated herein by reference.

BACKGROUND

(a) Technical Field

The present disclosure relates to a seat for a vehicle, more particularly, to the seat for a the vehicle which may easily implement a rear facing mode posture, in which passengers sit facing each other, a relaxed comfort posture, etc.

(b) Description of the Related Art

In an autonomous vehicle, swivel-type (rotation-type) seats may be mounted so as to be rotated at a designated angle in a desired direction in order to have a group meeting and conversation, to enjoy the view outside windows, etc.

In general, a conventional seat swivel mechanism is configured such that, in order to enable passengers sitting on a first row seat or a second row seat to face passengers sitting on the seat just behind the first row seat or the second row seat, the first or second row seat is rotated about an H shaft (height shaft of the vehicle).

However, the H shaft-based swivel mechanism requires interlocking of many parts, and is thus complicated and causes increases in weight and production cost.

Particularly, because the interior space of the vehicle is restricted, when the seat is rotated about the H shaft (height shaft of the vehicle), the seat may interfere with peripheral parts (for example, a console, a door trim, a center pillar, etc.), and thus it may be difficult to secure the rotational trajectory of the seat.

The above information disclosed in this Background section is only for enhancement of understanding of the background of the disclosure and therefore it may contain information that does not form the prior art that is already known in this country to a person of ordinary skill in the art.

SUMMARY

The present disclosure provides a seat for a vehicle which may be rotated in the forward and rearward directions as in a seesaw motion about the shaft of a vehicle in the width direction thereof, so as to easily implement a facing mode posture, in which passengers sit facing each other, a relaxed comfort posture, etc.

In one aspect, the present disclosure provides a seat for a vehicle including a seat frame configured such that a first seat frame part and a second seat frame part are formed integrally with each other at a designated angle, a pair of first support links provided with front ends connected to the first seat frame part using hinges and rear ends connected to rear parts of seat rails by a first rotating shaft, a pair of second support links provided with front ends connected to front parts of the seat rails by a second rotating shaft and rear ends connected to the second seat frame part using hinges, and a driving device connected to the first rotating shaft and the second rotating shaft so as to transmit rotating force thereto, and configured to adjust angles of inclination of the first support links and the second support links so as to rotate the seat frame forwards and rearwards.

In a preferred embodiment, the first support links may be disposed to be inclined downwards from the front ends thereof to the rear ends thereof, the second support links may be disposed to be inclined downwards from the rear ends thereof to the front ends thereof, and thus, the first support links and the second support links may be disposed to cross each other.

In another preferred embodiment, first hinge terminals formed at the front ends of the first support links and first hinge brackets provided on the first seat frame part may overlap each other and be hinge-coupled to each other, and second hinge terminals formed at the rear ends of the second support links and second hinge brackets provided on the second seat frame part may overlap each other and be hinge-coupled to each other.

In still another preferred embodiment, the first hinge brackets may be coupled to first guide rails mounted under a lower part of the first seat frame part so as to be slidably movable, and the second hinge brackets may be coupled to second guide rails mounted under a lower part of the second seat frame part so as to be slidably movable.

In yet another preferred embodiment, the first rotating shaft may be spline-coupled to the rear ends of the first support links so as to transmit rotating force thereto, and the second rotating shaft may be spline-coupled to the front ends of the second support links so as to transmit rotating force thereto.

In still yet another preferred embodiment, both ends of the first rotating shaft may be hinge-coupled to first support brackets mounted at the rear parts of the seat rails, and both ends of the second rotating shaft may be hinge-coupled to second support brackets mounted at the front parts of the seat rails.

In a further preferred embodiment, the driving device may include a first motor disposed around the first rotating shaft, a first gear box connected to an output shaft of the first motor and mounted on the first rotating shaft so as to transmit rotating force thereto, a second motor disposed around the second rotating shaft, and a second gear box connected to an output shaft of the second motor and mounted on the second rotating shaft so as to transmit rotating force thereto.

In another further preferred embodiment, a suspension device configured to support a boundary between the first seat frame part and the second seat frame part so that the boundary between the first seat frame part and the second seat frame part is movable upwards and downwards may be mounted on a support plate mounted on the seat rails.

In still another further preferred embodiment, the suspension device may include a guide pipe mounted on the support plate and configured to have a designated height, a spring installed in the guide pipe so as to be compressible, and a guide link provided with an upper end connected to a third hinge bracket formed on the boundary between the first seat frame part and the second seat frame part using a hinge, and a lower end inserted into the guide pipe and connected to an upper end of the spring, so as to be rectilinearly moved upwards and downwards.

In yet another further preferred embodiment, in order to assure upward and downward rectilinear movement of the guide link, a guide hole configured to extend in a vertical direction may be formed in the guide pipe, and a guide pin inserted into the guide hole may protrude from the guide link.

In still yet another further preferred embodiment, a first leg rest frame also used as a headrest frame may be mounted at a distal end of the first seat frame part, and a second leg rest frame also used as the headrest frame may be mounted at a distal end of the second seat frame part.

In a still further preferred embodiment, the first leg rest frame may be mounted at first mounting brackets mounted at the distal end of the first seat frame part by a first hinge shaft such that an angle of the first leg rest frame is adjustable, and the second leg rest frame may be mounted at second mounting brackets mounted at the distal end of the second seat frame part by a second hinge shaft such that an angle of the second leg rest frame is adjustable.

In a yet still further preferred embodiment, a third gear box connected to an output shaft of a third motor may be mounted on the first hinge shaft so as to transmit rotating force to the first hinge shaft, and a fourth gear box connected to an output shaft of a fourth motor may be mounted on the second hinge shaft so as to transmit rotating force to the second hinge shaft.

Other aspects and preferred embodiments of the disclosure are discussed infra.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will be made in detail to various embodiments of the present disclosure, examples of which are illustrated in the accompanying drawings and described below. While the disclosure will be described in conjunction with exemplary embodiments, it will be understood that present description is not intended to limit the disclosure to the exemplary embodiments. On the contrary, the disclosure is intended to cover not only the exemplary embodiments, but also various alternatives, modifications, equivalents and other embodiments, which may be within the spirit and scope of the disclosure as defined by the appended claims.

Figure 1:
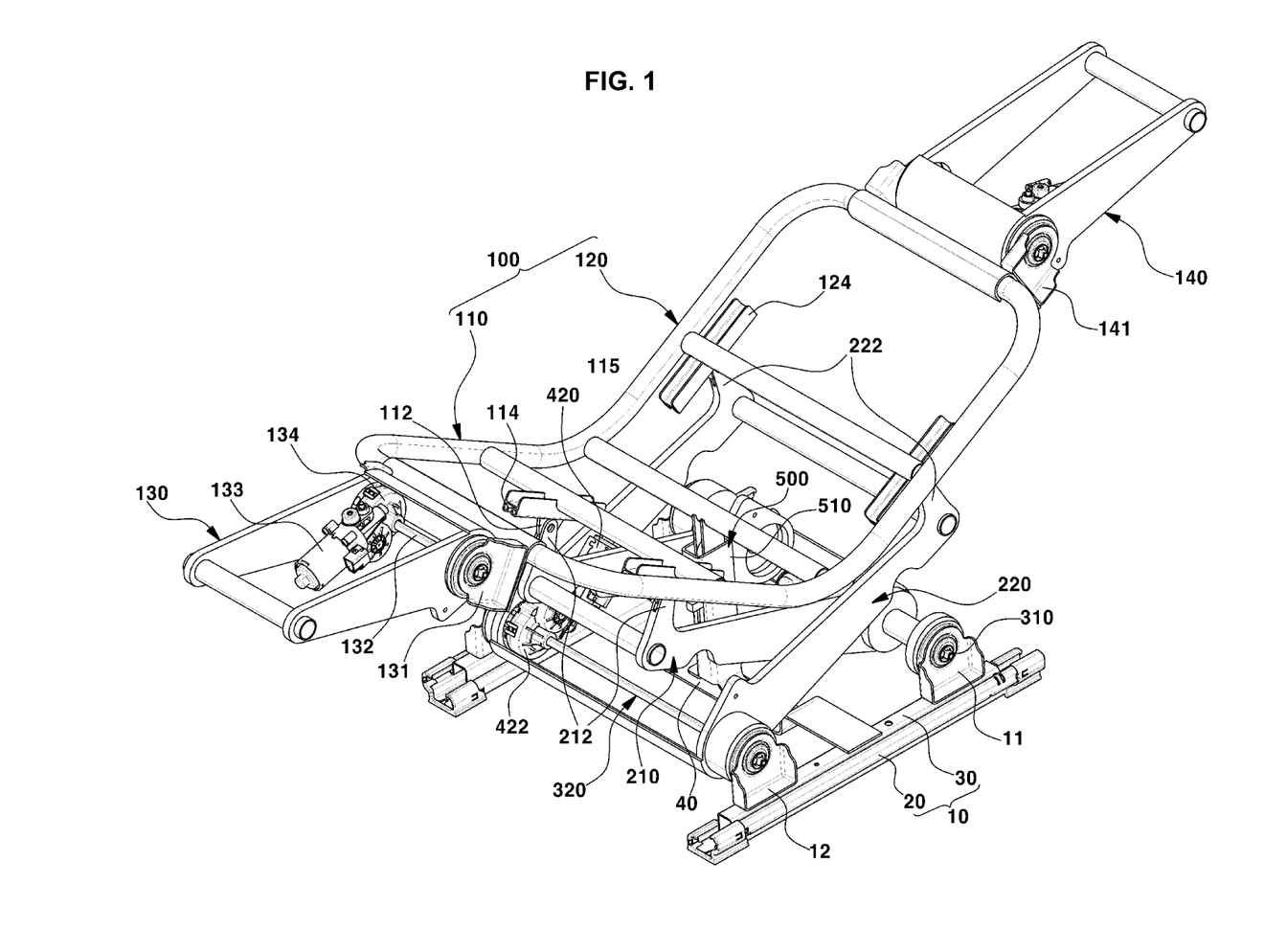
FIG. 1 is an assembled perspective view of a seat for a vehicle according to the present disclosure, as seen from the front.
Figure 2:
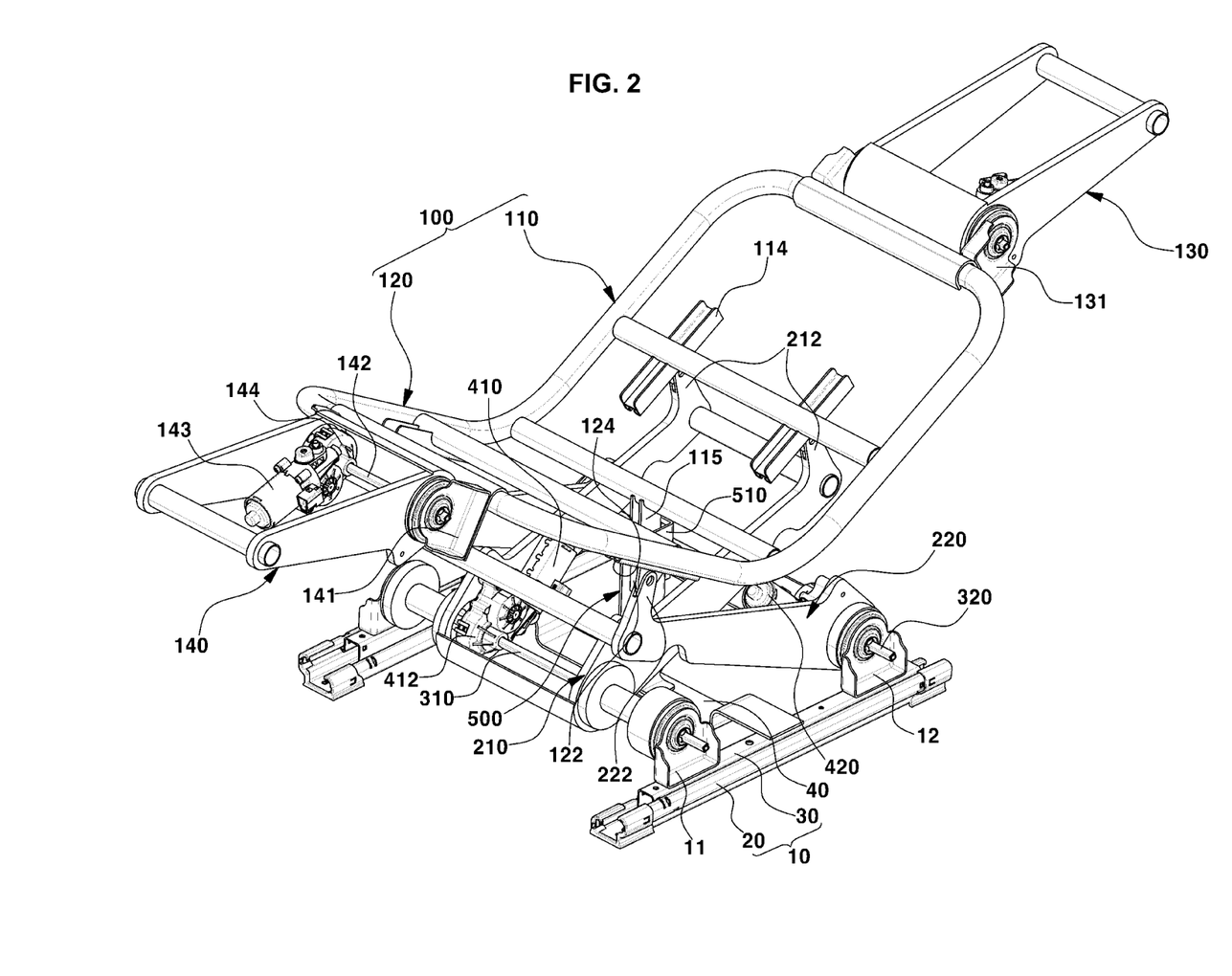
FIG. 2 is an assembled perspective view of the seat for a vehicle according to the present disclosure, as seen from the rear.

FIG. 1 is an assembled perspective view of a seat for a vehicle according to the present disclosure, as seen from the front, and FIG. 2 is an assembled perspective view of the seat for a vehicle according to the present disclosure, as seen from the rear. In the respective figures, reference numeral 100 indicates a seat frame.

The seat frame 100 is manufactured to have a structure in which a first seat frame part 110 and a second seat frame part 120 are formed integrally with each other at a designated angle.

Particularly, the first seat frame part 110 and the second seat frame part 120 may be manufactured to have the same shape, and thereby, the second seat frame part 120 may be used as a seat cushion when the first seat frame part 110 is used as a seat back, and the second seat frame part 120 may be used as a seat back when the first seat frame part 110 is used as a seat cushion.

The first seat frame part 110 is supported by a pair of first support links 210 connected to seat rails 10 so as to be rotatable forwards and rearwards, and the second seat frame part 120 is supported by a pair of second support links 220 connected to the seat rails 10 so as to be rotatable forwards and rearwards.

For this purpose, the front ends of the first support links 210 are connected to the lower part of the first seat frame part 110 using hinges, and the rear ends of the first support links 210 are connected to the rear parts of the seat rails 10 by a first rotating shaft 310.

Further, the front ends of the second support links 220 are connected to the front parts of the seat rails 10 by a second rotating shaft 320, and the rear ends of the second support links 220 are connected to the lower part of the second seat frame part 120 using hinges.

Particularly, first hinge terminals 212 bent upwards are formed at the front ends of the first support links 210, first hinge brackets 112 are provided at the lower part of the first seat frame part 110, and thus, the first hinge terminals 212 and the first hinge brackets 112 overlap each other and are coupled to each other using hinge pins.

In the same manner, second hinge terminals 222 bent upwards are formed at the rear ends of the second support links 220, second hinge brackets 122 are provided at the lower part of the second seat frame part 110, and thus, the second hinge terminals 222 and the second hinge brackets 122 overlap each other and are coupled to each other using hinge pins.

Therefore, the first support links 210 are disposed to be inclined downwards from the front ends thereof connected to the first seat frame part 110 to the rear ends thereof combined with the first rotating shaft 310, the second support links 220 are disposed to be inclined downwards from the rear ends thereof connected to the second seat frame part 120 to the front ends thereof combined with the second rotating shaft 320, and thus, the first support links 210 and the second support links 220 are disposed to cross each other in an X shape.

Here, in order to easily assure the rotating trajectories of the first seat frame part 110 and the second seat frame part 120 in the forward and rearward directions as in a seesaw motion, the positions of the first hinge brackets 112 of the first seat frame part 110 hinge-coupled to the first hinge terminals 212 of the first support links 210 and the second hinge brackets 122 of the second seat frame part 120 hinge-coupled to the second hinge terminals 222 of the second support links 220 need to be varied.

For this purpose, the first hinge brackets 112 are coupled to first guide rails 114 separately mounted under the lower part of the first seat frame part 110 so as to be slidably movable, and the second hinge brackets 122 are coupled to second guide rails 124 separately mounted under the lower part of the second seat frame part 120 so as to be slidably movable.

Particularly, the first rotating shaft 310 is spline-coupled to the rear ends of the first support links 210 so as to transmit rotating force thereto, and the second rotating shaft 320 is spline-coupled to the front ends of the second support links 220 so as to transmit rotating force thereto.

Further, both ends of the first rotating shaft 310 are hinge-coupled to first support brackets 11 mounted at the rear parts of the seat rails 10, and both ends of the second rotating shaft 320 are hinge-coupled to second support brackets 12 mounted at the front parts of the seat rails 10.

Particularly, the first support brackets 11 are mounted at the rear parts of movable rails 30 mounted on stationary rails 20 so as to be movable forwards and rearwards, out of elements of the seat rails 10, and the second support brackets 12 are mounted at the front parts of the movable rails 30.

The seat for a vehicle according to the present disclosure includes a driving device configured to rotate the seat frame 100 including the first seat frame part 110 and the second seat frame part 120 forwards and rearwards as in a seesaw motion.

The driving device is connected to the first rotating shaft 310 and the second rotating shaft 320 so as to transmit rotating force thereto, the angles of inclination of the first support links 210 and the second support links 220 are adjusted due to driving of the driving device, and thereby, the seat frame 100 including the first seat frame part 110 and the second seat frame part 120 may be rotated forwards and rearwards.

For this purpose, the driving device includes a first motor 410 disposed around the first rotating shaft 310, a first gear box 412 connected to the output shaft of the first motor 410 and mounted on the first rotating shaft 310 so as to transmit rotating force thereto, a second motor 420 disposed around the second rotating shaft 320, and a second gear box 422 connected to the output shaft of the second motor 420 and mounted on the second rotating shaft 320 so as to transmit rotating force thereto.

For example, the first rotating shaft 310 may be rotated by receiving rotating force through engagement between a driving gear (not shown) provided in the first gear box 412 and a driven gear (not shown) mounted on the first rotating shaft 310, and thereby, the first support links 210 spline-coupled to the first rotating shaft 310 may be rotated forwards and rearwards.

In the same manner, the second rotating shaft 320 may be rotated by receiving rotating force through engagement between a driving gear (not shown) provided in the second gear box 422 and a driven gear (not shown) mounted on the second rotating shaft 320, and thereby, the second support links 220 spline-coupled to the second rotating shaft 320 may be rotated forwards and rearwards.

According to the present disclosure, a support plate 40 is mounted on the movable rails 30 of the seat rails 10, and a suspension device 500 configured to support the boundary between the first seat frame part 110 and the second seat frame part 120 so that the boundary between the first seat frame part 110 and the second seat frame part 120 is movable upwards and downwards is mounted on the support plate 40.

Figure 3A:
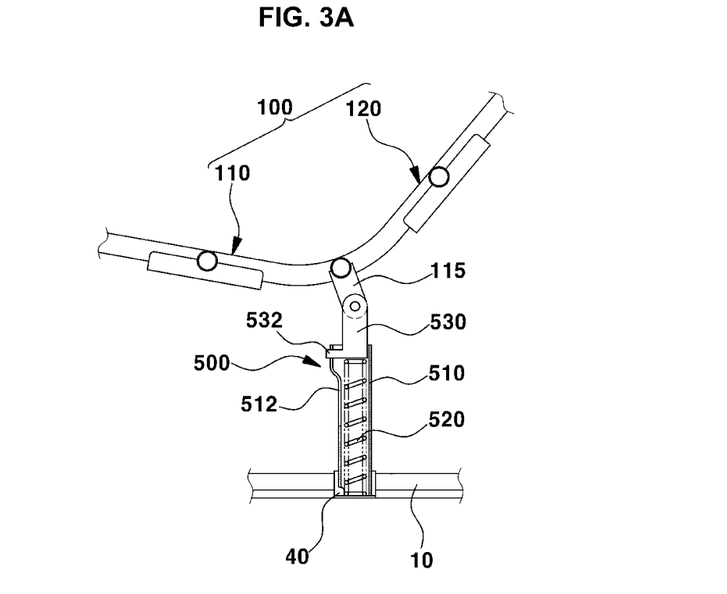
FIGS. 3A to 3C are enlarged cross-sectional views illustrating an essential portion of a suspension device of the seat for a vehicle according to the present disclosure.
Figure 3B:
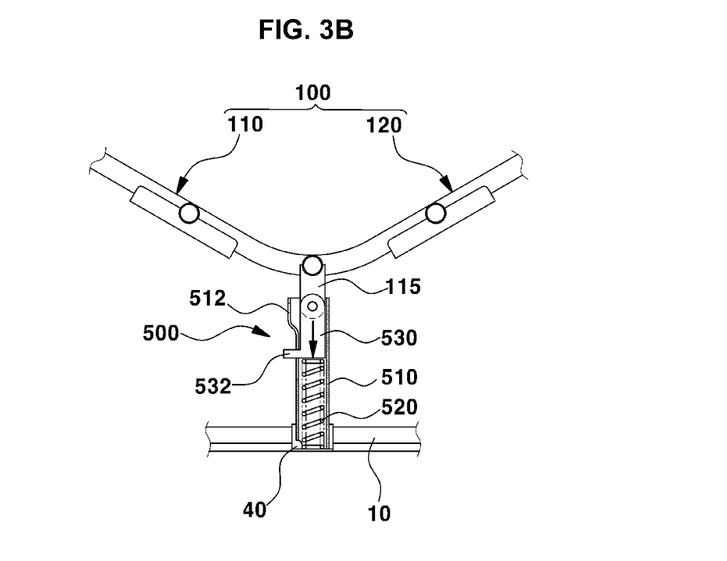
Figure 3C:
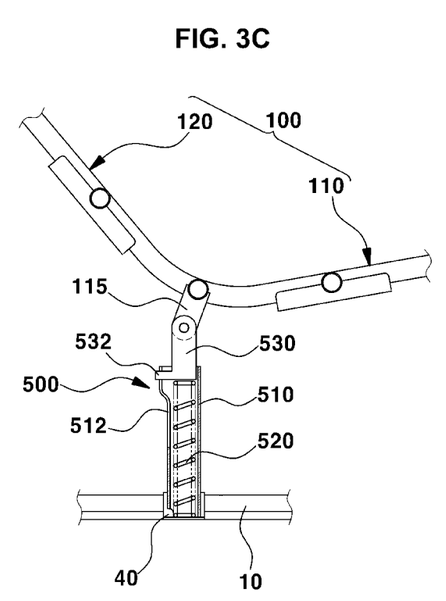

In more detail, the suspension device 500 includes, as shown in FIGS. 3A-3C, a guide pipe 510 mounted on the support plate 40 and configured to have a designated height, a spring 520 installed in the guide pipe 510 so as to be compressible, and a guide link 530 configured to support the boundary between the first seat frame part 110 and the second seat frame part 120 and inserted into the guide pipe 510 so as to be rectilinearly movable upwards and downwards.

Here, the upper end of the guide link 530 is connected to a third hinge bracket 115 formed on the lower part of the boundary between the first seat frame part 110 and the second seat frame part 120 using a hinge, and the lower end of the guide link 530 is inserted into the guide pipe 510 and connected to the upper end of the spring 520 so as to compress the spring 520.

Particularly, in order to assure the upward and downward rectilinear movement of the guide link 530, a guide hole 512 extending in the vertical direction may be formed in the guide pipe 510, and a guide pin 532 inserted into the guide hole 512 may protrude from the guide link 530.

Therefore, when the seat frame 100 including the first seat frame part 110 and the second seat frame part 120 is rotated forwards or rearwards, the boundary between the first seat frame part 110 and the second seat frame part 120 is slightly moved downwards, and in this case, the third hinge bracket 115 presses the guide link 530 of the suspension device 500 downwards, and the guide link 530 is moved downwards by a designated distance while compressing the spring 520 in the guide pipe 510.

On the other hand, when the forward or rearward rotation of the seat frame 100 including the first seat frame part 110 and the second seat frame part 120 has been completed, the boundary between the first seat frame part 110 and the second seat frame part 120 is slightly moved upwards, and in this case, the guide link 530 in the guide pipe 510 is rectilinearly moved upwards due to the elastic restoring force of the spring 520, and thus, supports the boundary between the first seat frame part 110 and the second seat frame part 120 while pushing the boundary between the first seat frame part 110 and the second seat frame part 120 upwards.

As such, when the seat frame 100 including the first seat frame part 110 and the second seat frame part 120 is rotated forwards or rearwards, or when the forward or rearward rotation of the seat frame 100 including the first seat frame part 110 and the second seat frame part 120 has been completed, the suspension device 500 supports the boundary between the first seat frame part 110 and the second seat frame part 120, thereby being capable of preventing movement of the seat frame 100 and dispersing the load of passengers.

According to the present disclosure, a first leg rest frame 130 also used as a headrest frame is mounted at the distal end of the first seat frame part 110, and a second leg rest frame 140 also used as a headrest frame is mounted at the distal end of the second seat frame part 120.

Therefore, when the first seat frame part 110 is used as a seat cushion and the second seat frame part 120 is used as a seat back, the first leg rest frame 130 may be used as a leg rest and the second leg rest frame 140 may be used as a headrest.

On the other hand, when the first seat frame part 110 is used as a seat back and the second seat frame part 120 is used as a seat cushion, the first leg rest frame 130 may be used as a headrest and the second leg rest frame 140 may be used as a leg rest.

For this purpose, the first seat frame part 110 and the second seat frame part 120 may be provided to have the same shape, and the first leg rest frame 130 and the second leg rest frame 140 may be provided to have the same shape.

Here, the first leg rest frame 130 is mounted at first mounting brackets 131, mounted at the distal end of the first seat frame part 110 by welding or the like, by a first hinge shaft 132 such that the angle of the first leg rest frame 130 is adjustable, and the second leg rest frame 140 is mounted at second mounting brackets 141, mounted at the distal end of the second seat frame part 120 by welding or the like, by a second hinge shaft 142 such that the angle of the second leg rest frame 140 is adjustable.

Further, a third gear box 134 connected to the output shaft of a third motor 133 is mounted as a driving unit configured to adjust the angle of the first leg rest frame 130 on the first hinge shaft 132 so as to transmit rotating force to the first hinge shaft 132, and a fourth gear box 144 connected to the output shaft of a fourth motor 143 is mounted as a driving unit configured to adjust the angle of the second leg rest frame 140 on the second hinge shaft 142 so as to transmit rotating force to the second hinge shaft 142.

Hereinafter, the operating flow of the seat for a vehicle having the above-described configuration according to the present disclosure will be described.

Figure 4:
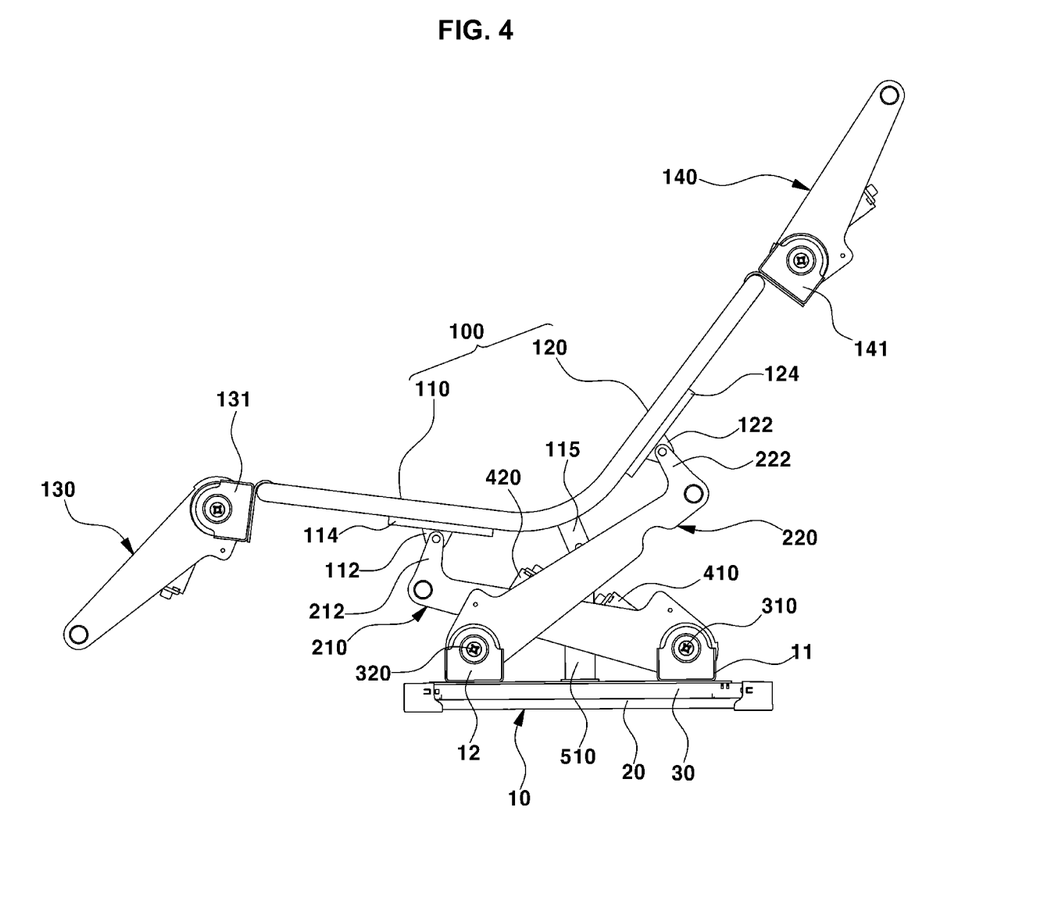
FIG. 4 is a side view of the seat for a vehicle according to the present disclosure, in the state in which the seat for a vehicle is adjusted so as to face towards the front part of a vehicle.

FIG. 4 is a side view of the seat for a vehicle according to the present disclosure, in the state in which the seat for a vehicle is adjusted so as to face the front part of a vehicle.

The seat for a vehicle according to the present disclosure may be adjusted so as to face the front part of the vehicle.

For this purpose, when rotation driving force of the first motor 410 of the driving device in one direction is transmitted to the first rotating shaft 310 through the first gear box 412, the first rotating shaft 310 is rotated in the corresponding direction and the front ends of the first support links 210 are rotated downwards about the rear ends thereof connected to the first rotating shaft 310 simultaneously, and thereby, the first seat frame part 110 connected to the front ends of the first support links 210 using the hinges may be rotated forwards so as to be adjusted to the position of a seat cushion on which a passenger may sit.

Simultaneously, when rotation driving force of the second motor 430 of the driving device in one direction is transmitted to the second rotating shaft 320 through the second gear box 422, the second rotating shaft 320 is rotated in the corresponding direction and the rear ends of the second support links 220 are rotated upwards about the front ends thereof connected to the second rotating shaft 320 simultaneously, and thereby, the second seat frame part 120 connected to the rear ends of the second support links 220 using the hinges may be rotated forwards so as to be adjusted to the position of a seat back over which the passenger may lean.

Therefore, as shown in FIG. 4, the first seat frame part 110 is adjusted to the position of the seat cushion on which the passenger may sit, the second seat frame part 120 is adjusted to the position of the seat back over which the passenger may lean, and thereby, the seat for a vehicle may be adjusted so as to face the front part of the vehicle.

Here, when forward rotation of the seat frame 100 including the first seat frame part 110 and the second seat frame part 120 has been completed, the guide link 530 in the guide pipe 510 is rectilinearly moved upwards due to elastic restoring force of the spring 520, and thus, supports the boundary provided with the second hinge bracket 115 between the first seat frame part 110 and the second seat frame part 120 while pushing the boundary between the first seat frame part 110 and the second seat frame part 120 upwards.

Further, the first leg rest frame 130 may be spread through rotation of the first hinge shaft 132 due to driving of the third motor 133 and thus be used as a leg rest on which the passenger may put his/her legs, and simultaneously, the second leg rest frame 140 may be rotated forwards through rotation of the second hinge shaft 143 due to driving of the fourth motor 143 and thus be used as a headrest which may support the passenger's head.

As such, when the first seat frame part 110 is used as the seat cushion and the second seat frame part 120 is used as the seat back, the first leg rest frame 130 may be used as the leg rest and the second leg rest frame 140 may be used as the headrest.

Figure 5:
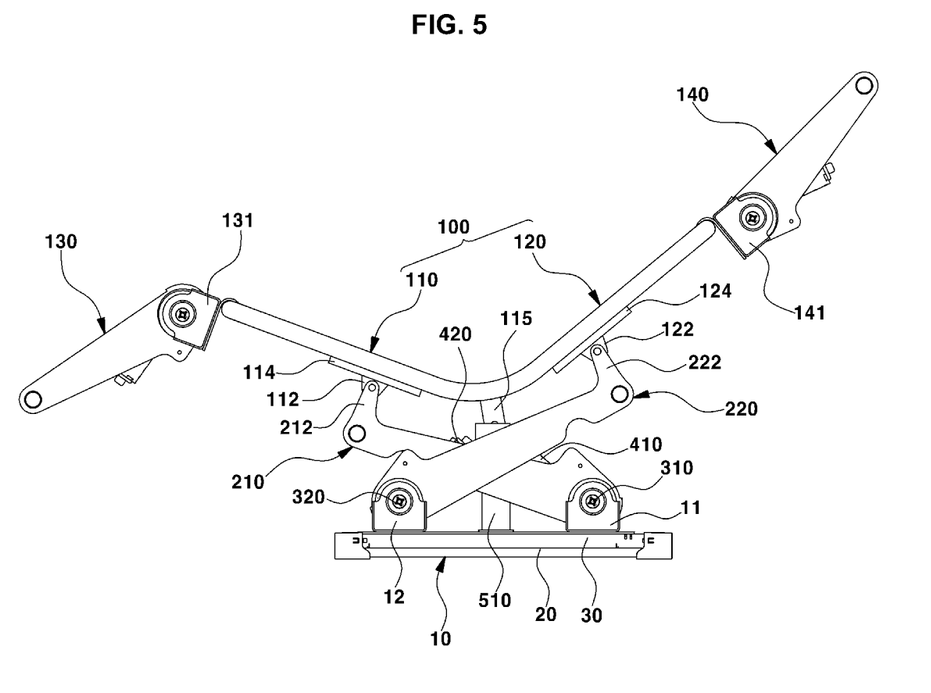
FIG. 5 is a side view of the seat for a vehicle according to the present disclosure, in the state in which the seat for a vehicle is adjusted to a relaxed comfort posture.

FIG. 5 is a side view of the seat for a vehicle according to the present disclosure, in the state in which the seat for a vehicle is adjusted to the relaxed comfort posture.

The seat for a vehicle according to the preset disclosure in the state in which the seat for a vehicle is adjusted so as to face the front part of the vehicle or in the state in which the seat for a vehicle is adjusted so as to face the rear part of the vehicle, may be easily adjusted to the relaxed comfort posture as if a passenger lies down to rest.

In order to assist in understating of the present disclosure, operation of converting the seat for a vehicle from the state in which the seat for a vehicle is adjusted so as to face the front part of the vehicle, as shown in FIG. 4, to the relaxed comfort gesture will be exemplarily described below.

When rotation driving force of the first motor 410 of the driving device in the other direction is transmitted to the first rotating shaft 310 through the first gear box 412, the first rotating shaft 310 is rotated in the corresponding direction and the front ends of the first support links 210 are rotated upwards about the rear ends thereof connected to the first rotating shaft 310 simultaneously, and subsequently, the first seat frame part 110 connected to the front ends of the first support links 210 using the hinges is rotated rearwards, thereby being capable of implementing tilting of the seat cushion.

Simultaneously, when rotation driving force of the second motor 430 of the driving device in the other direction is transmitted to the second rotating shaft 320 through the second gear box 422, the second rotating shaft 320 is rotated in the corresponding direction and the rear ends of the second support links 220 are rotated downwards about the front ends thereof connected to the second rotating shaft 320 simultaneously, and subsequently, the second seat frame part 120 connected to the rear ends of the second support links 220 using the hinges is rotated rearwards, thereby being capable of implementing reclining of the seat back.

Thereby, as shown in FIG. 5, the first support links 210 and the second support links 220 are disposed at heights, which are almost equal to each other, so as to cross each other in an X shape.

As such, the tilting operation of the first seat frame part 110 used as the seat cushion and the reclining operation of the second seat frame part 120 used as the seat back are performed, thereby being capable of easily implementing the relaxed comfort posture as if the passenger lies down to rest.

Further, when the seat frame 100 including the first seat frame part 110 and the second seat frame part 120 is rotated rearwards so as to implement the relaxed comfort posture, the boundary between the first seat frame part 110 and the second seat frame part 120 is slightly moved downwards, and in this case, the third hinge bracket 115 presses the guide link 530 of the suspension device 500 downwards, and the guide link 530 is moved downwards by a designated distance while compressing the spring 520 in the guide pipe 510, and thus supports the seat frame 100 without movement.

Figure 6:
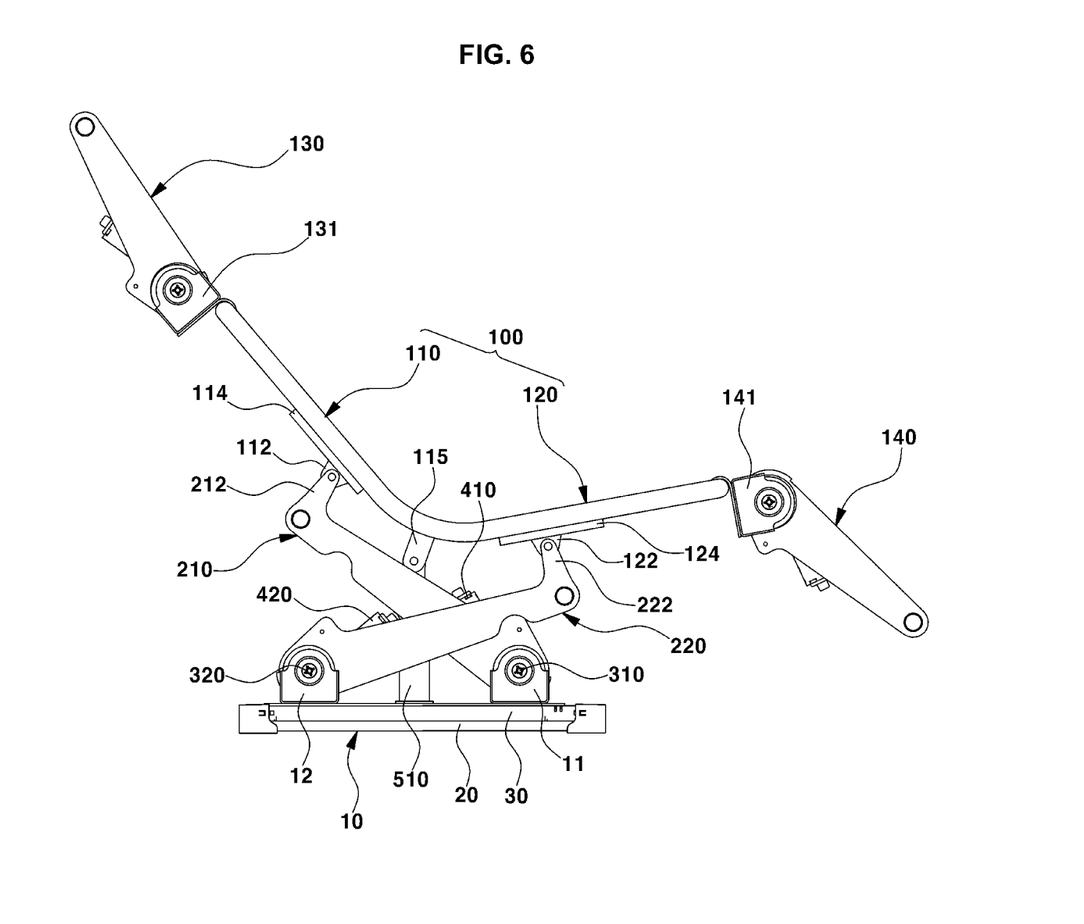
FIG. 6 is a side view of the seat for a vehicle according to the present disclosure, in the state in which the seat for a vehicle is adjusted so as to face towards the rear part of the vehicle.

FIG. 6 is a side view of the seat for a vehicle according to the present disclosure, in the state in which the seat for a vehicle is adjusted so as to face the rear part of the vehicle.

The seat for a vehicle according to the present disclosure may be adjusted so as to face the rear part of the vehicle, in order to implement a facing mode in which the passenger sitting on the seat for a vehicle faces a passenger sitting on another seat for a vehicle placed just behind the seat for a vehicle.

For this purpose, when rotation driving force of the first motor 410 of the driving device in the other direction is transmitted to the first rotating shaft 310 through the first gear box 412, the first rotating shaft 310 is rotated in the corresponding direction and the front ends of the first support links 210 are rotated upwards about the rear ends thereof connected to the first rotating shaft 310 simultaneously, and thereby, the first seat frame part 110 connected to the front ends of the first support links 210 using the hinges may be rotated rearwards so as to be adjusted to the position of a seat back over which a passenger may lean.

Simultaneously, when rotation driving force of the second motor 430 of the driving device in the other direction is transmitted to the second rotating shaft 320 through the second gear box 422, the second rotating shaft 320 is rotated in the corresponding direction and the rear ends of the second support links 220 are rotated downwards about the front ends thereof connected to the second rotating shaft 320 simultaneously, and thereby, the second seat frame part 120 connected to the rear ends of the second support links 220 using the hinges may be rotated rearwards so as to be adjusted to the position of a seat cushion on which the passenger may sit.

Therefore, as shown in FIG. 6, the first seat frame part 110 is adjusted to the position of the seat back over which the passenger may lean and the second seat frame part 120 is adjusted to the position of the seat cushion on which the passenger may sit simultaneously, and thereby, the seat for a vehicle may be adjusted so as to face the rear part of the vehicle and the passenger sitting on the seat for a vehicle may face a passenger sitting on another seat for a vehicle placed just behind the seat for a vehicle.

Here, when rearward rotation of the seat frame 100 including the first seat frame part 110 and the second seat frame part 120 has been completed, the guide link 530 in the guide pipe 510 is rectilinearly moved upwards due to elastic restoring force of the spring 520, and thus, supports the boundary provided with the second hinge bracket 115 between the first seat frame part 110 and the second seat frame part 120 while pushing the boundary between the first seat frame part 110 and the second seat frame part 120 upwards.

Further, the first leg rest frame 130 may be rotated rearwards through rotation of the first hinge shaft 132 due to driving of the third motor 133 and thus be used as a headrest which may support the passenger's head, and simultaneously, the second leg rest frame 140 may be spread through rotation of the second hinge shaft 143 due to driving of the fourth motor 143 and thus be used as a leg rest on which the passenger may put his/her legs.

As such, when the first seat frame part 110 is used as the seat back and the second seat frame part 120 is used as the seat cushion, the first leg rest frame 130 may be used as the headrest and the second leg rest frame 140 may be used as the leg rest.

As described above, the seat frame 100 including the first seat frame part 110 and the second seat frame part 120 may be rotated forwards and rearwards as in the seesaw motion about the shaft of the vehicle in the width direction thereof using the first support links 210, the second support links 220, etc., and thus, the seat for a vehicle according to the present disclosure may be easily adjusted to the facing mode posture, in which passengers sit facing each other, the relaxed comfort posture, etc.

As is apparent from the above description, a seat for a vehicle according to the present disclosure may provide the following effects.

First, the seat for a vehicle according to the present disclosure may be rotated forwards and rearwards as in the seesaw motion about the shaft of a vehicle in the width direction thereof, and may thus be easily adjusted to the facing mode posture, in which passengers sit facing each other, the relaxed comfort posture, etc.

Second, the seat for a vehicle according to the present disclosure may provide a seat swiveling effect using a smaller number of parts and a simple structure compared to the conventional H shaft-based seat swiveling mechanism requiring a large number of parts and having a complicated structure.

Third, the seat for a vehicle according to the present disclosure may be rotated forwards and rearwards about the shaft of the vehicle in the width direction thereof, thereby being capable of easily implementing the facing mode posture, the relaxed comfort posture, etc., while eliminating interference with peripheral parts (for example, a console, a door trim, a center pillar, etc.).

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A seat for a vehicle, the seat comprising:
   a seat frame configured such that a first seat frame part and a second seat frame part are formed integrally with each other at a predetermined angle;
   a pair of first support links provided with front ends connected to the first seat frame part using hinges and rear ends connected to rear parts of seat rails by a first rotating shaft;
   a pair of second support links provided with front ends connected to front parts of the seat rails by a second rotating shaft and rear ends connected to the second seat frame part using hinges; and
   a driving device connected to the first rotating shaft and the second rotating shaft so as to transmit rotating force thereto, and configured to adjust angles of inclination of the first support links and the second support links so as to rotate the seat frame forwards and rearwards,
   wherein a first leg rest frame to be also used as a headrest frame is mounted at a distal end of the first seat frame part, and a second leg rest frame to be also used as the headrest frame is mounted at a distal end of the second seat frame part.

2. The seat of claim 1, wherein the pair of first support links are disposed to be inclined downwards from the front ends thereof to the rear ends thereof, the pair of second support links are disposed to be inclined downwards from the rear ends thereof to the front ends thereof, and thus, the pair of first support links and the pair of second support links are disposed to cross each other.

3. The seat of claim 1, wherein first hinge terminals formed at the front ends of the first support links and first hinge brackets provided on the first seat frame part overlap each other and are hinge-coupled to each other, and second hinge terminals formed at the rear ends of the second support links and second hinge brackets provided on the second seat frame part overlap each other and are hinge-coupled to each other.

4. The seat of claim 3, wherein the first hinge brackets are coupled to first guide rails mounted under a lower part of the first seat frame part so as to be slidably movable, and the second hinge brackets are coupled to second guide rails mounted under a lower part of the second seat frame part so as to be slidably movable.

5. The seat of claim 1, wherein the first rotating shaft is spline-coupled to the rear ends of the first support links so as to transmit rotating force thereto, and the second rotating shaft is spline-coupled to the front ends of the second support links so as to transmit rotating force thereto.

6. The seat of claim 5, wherein both ends of the first rotating shaft are hinge-coupled to first support brackets mounted at the rear parts of the seat rails, and both ends of the second rotating shaft are hinge-coupled to second support brackets mounted at the front parts of the seat rails.

7. The seat of claim 1, wherein the driving device comprises:
   a first motor disposed around the first rotating shaft;
   a first gear box connected to an output shaft of the first motor and mounted on the first rotating shaft so as to transmit rotating force thereto;
   a second motor disposed around the second rotating shaft; and
   a second gear box connected to an output shaft of the second motor and mounted on the second rotating shaft so as to transmit rotating force thereto.

8. The seat of claim 1, wherein a suspension device configured to support a boundary between the first seat frame part and the second seat frame part so that the boundary between the first seat frame part and the second seat frame part is movable upwards and downwards is mounted on a support plate mounted on the seat rails.

9. The seat of claim 8, wherein the suspension device comprises:
   a guide pipe mounted on the support plate and configured to have a predetermined height;
   a spring installed in the guide pipe so as to be compressible; and
   a guide link provided with an upper end connected to a third hinge bracket disposed on an underside of a crossbar extending between left and right boundaries of the first seat frame part and the second seat frame part, and a lower end of which is inserted into the guide pipe and connected to an upper end of the spring, so as to be rectilinearly moved upwards and downwards.

10. The seat of claim 9, wherein, in order to assure upward and downward rectilinear movement of the guide link, a guide hole configured to extend in a vertical direction is formed in the guide pipe, and a guide pin inserted into the guide hole protrudes from the guide link.

11. The seat of claim 1, wherein the first leg rest frame is mounted at a first mounting brackets mounted at the distal end of the first seat frame part such that an angle of the first leg rest frame is adjustable by a first hinge shaft of the hinge bracket, and the second leg rest frame is mounted at second mounting brackets mounted at the distal end of the second seat frame part by a second hinge shaft such that an angle of the second leg rest frame is adjustable.

12. The seat of claim 11, wherein a third gear box connected to an output shaft of a third motor is mounted on the first hinge shaft so as to transmit rotating force to the first hinge shaft, and a fourth gear box connected to an output shaft of a fourth motor is mounted on the second hinge shaft so as to transmit rotating force to the second hinge shaft.

13. The seat of claim 1, wherein the first seat frame part and the second seat frame part are provided to have the same shape, and the first leg rest frame and the second leg rest frame are provided to have the same shape.

\* \* \* \* \*